May 6, 1952  B. L. SCHWALLER  2,595,986
CONCENTRIC TYPE VALVE
Filed Aug. 25, 1949
FIG_1_
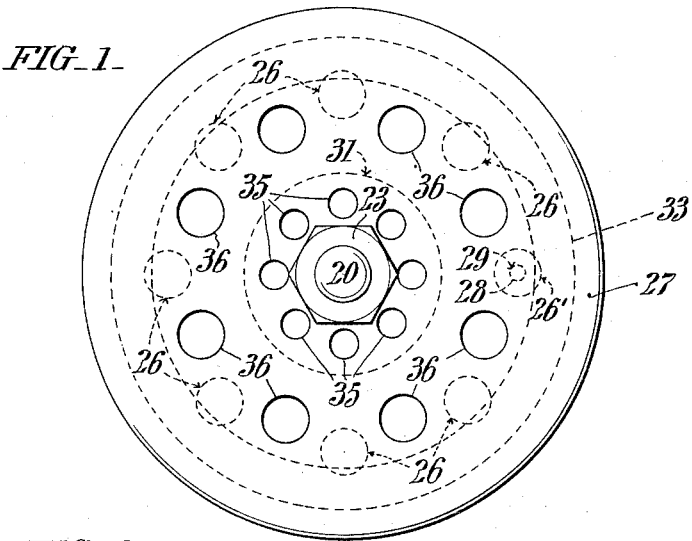
FIG_2_
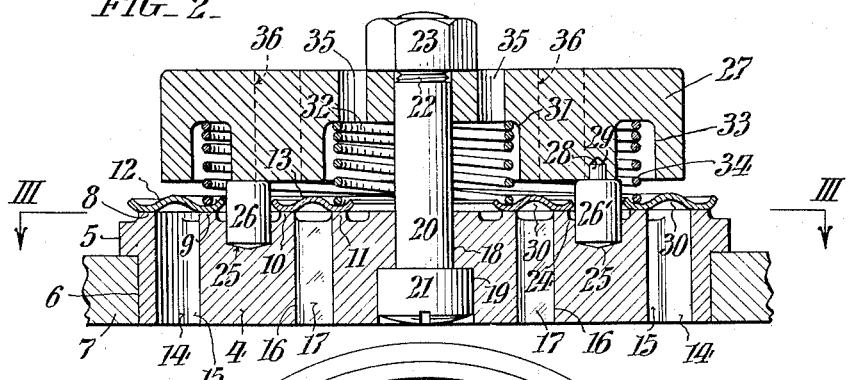
FIG_3_
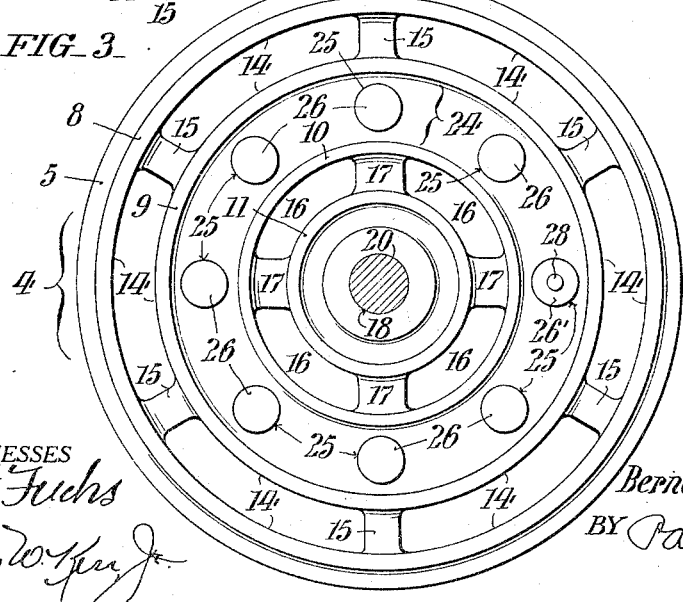
WITNESSES
Hubert Fuchs
Thomas W. Kerr Jr.
INVENTOR:
Bernard L. Schwaller,
BY Paul & Paul
ATTORNEYS.

Patented May 6, 1952

2,595,986

UNITED STATES PATENT OFFICE 2,595,986

CONCENTRIC TYPE VALVE

Bernard L. Schwaller, Wayne, Pa., assignor to Durabla Manufacturing Company, New York, N. Y., a corporation of New York Application August 25, 1949, Serial No. 112,277

5 Claims. (Cl. 251—119)

This invention has general reference to valves for use in compressors, pumps or the like and has for its primary object to provide a novel type of intake and discharge unit including concentric valve elements, under the action of concentrically related springs that normally function to influence such valve elements into closed position.

Another object of this invention is to provide a valve unit of the above indicated species in which the concentric valve elements are mutually guided, during opening and closing, by an intervening ring of circumferentially spaced units or pins whereby "canting" or "jamming" of said valve elements is positively prevented and the efficiency of the valve unit considerably increased.

A further object of this invention is to provide a valve unit of the above indicated type including novel means for expeditiously locating and spacedly positioning the guard component of said valve unit coaxially aligned above the concentric valve elements, without diminishing or blocking-off any of the intended flow passage through the valve ports.

A still further object of this invention is to provide a valve unit of the species above indicated characterized by a much increased effective valve area, and which is of a structural form enabling positive control of the valve lift, as well as the speedy making of repairs, or the replacement of damaged parts.

With the above stated and other objects as well as ancillary advantages in view, this invention essentially consists in the combination and relative arrangement of parts, as well as the structural improvements hereinafter fully disclosed and illustrated by the accompanying sheet of drawings; while the novel features for which patent protection is sought are more concisely expressed in the claims.

In the drawings:

Fig. 1 is a plan view of a typical embodiment of this invention.

Fig. 2 is a central vertical section of Fig. 1; and,

Fig. 3 is a plan view of the valve seat, taken approximately on the plane designated by the arrows III—III in Fig. 2.

In describing the form of the invention exemplified by the sheet of drawings herewith, specific terms will be used for the sake of clarity, but it is to be understood the scope of said invention is not thereby limited; each such term being intended to embrace all equivalents which perform the same function for an analogous purpose.

Referring more in detail to the drawings the improved concentric valve of this invention comprises a ported seat member 4, embodying a surrounding stop rim 5 serviceable to limit drift or other securement of said member in a receptive aperture 6, provided for the purpose in the deck 7 Fig. 2 of a compressor, for example only. The seat member 4 is preferably cast, or otherwise formed, to embody outer and inner concentric and raised companion valve seating areas 8, 9 and 10, 11, respectively; the outer areas 8, 9 jointly affording support for an annular valve element 12; and the inner areas 10, 11 similarly supporting a, preferably, narrower annular valve element 13. Attention is here directed to the fact that the seat member 4 is provided with a series of six, for example only, corresponding segmental ports 14, set apart by radial webs 15, under control of the outer annular valve element 12; whereas the inner valve element 13 correspondingly controls four, for instance, relatively smaller segmental-ports 16, set apart by radial webs 17, intermediate the inner seat areas 10, 11.

The seat member 4 is also provided with an axial bore 18 and counter-bore 19, respectively functional to receive the upwardly directed shank of a center-bolt 20, the head 21 whereof fits in the counter-bore 19; while the bolt shank has its free end screw-threaded at 22, for reception of a lock-nut 23 to hold the valve as a unit in assembly.

In order that the concentric valve elements 12, 13 may be vertically guided, during opening and closing, an annular groove 24 intervening the seating areas 8, 9 and 10, 11 is provided with a series, or plurality, of equally-spaced circumferentially-arranged sockets 25, of predetermined depth, for reception of a complemental number of guide elements or vertically directed spacer pins or studs 26 the upper ends whereof are preferably flat and disposed in a common plane to provide a definitely spaced level for the guard member 27 relative to the ported seat member 4. It is to be particularly observed that one of the pins, or that designated 26' in the drawings, is conveniently provided with a pointed axial extension 28 functional to enter and engage in a correspondingly-shaped hole 29 provided for its reception in the lower part of the guard member 27. It will, now, be readily understood that when placing the guard 27 on the center-bolt 20, it is not only centralized, relative to the annular valve elements 12, 13, but that it is positively positioned by, and engaged on, the guide-pins 26 by entry of the pointed extension 28 on the pin 26' incident to a partial turn of said guard 27 about the center-bolt 20; to the effective elimination of any indirect or interrupted flow through the valve as a unit.

Conveniently, although not essentially, the valve elements 12, 13 are of the species cross-sectionally embodying an annular arched ridge 30, Fig. 2, intermediate concentrically related concaved rim portions that engage the associated seating areas 8, 9 and 10, 11; such arched ridges 30 being located directly over the outer and inner segmental ports 14 and 16, respectively, for control of flow through said ports as well as conducive to even lift of the valve elements 12, 13, in an obvious manner.

Referring again to the guard member 27 the same is provided, or formed, with a central recess 31 in its underside, of a diameter and depth to house a variable-pitch spring 32 in compression between the inner rim part of the valve element 13 and the bottom of said recess 31; while a concentric outer annular groove 33 is of a width or cross-section to correspondingly accommodate another similar type spring 34 in compression intermediate the inner rim portion of the outer valve element 12 and the inner end wall of said groove 33; while said springs 32, 34 function to substantially reduce or eliminate "surge." Note is also to be had that the inner end wall of the central recess 31 is provided with an annular series of equally spaced flow-passages 35; while the guard-member 27 is correspondingly equipped with a similar series of larger diameter through passages 36 which radially intervene the flow-passages 35, as readily understood from Fig. 1, more particularly.

From the foregoing it is felt the merits and advantages of this invention will be clearly apparent; also that the pins 26, 26' jointly function as a common guide means for the concentric annular valve elements 12, 13 and that they definitely space the guard 27 above the seat member 4 and thereby limit the lift of the valve elements 12, 13. Furthermore the pins 26, 26' jointly constrain the valve elements 12, 13 to directly vertical opening and closing movement in a common horizontal plane; aided by the resistive action set-up by the volume of air or liquid entrained in the guard recesses 31, 33 jointly functioning with a dash-pot action to decrease the force with which the valve elements 12, 13 strike the confronting face of the guard-member 27. Still further the guard member 27 serves as a positive stop for the valve lift while at the same time effectively preventing the springs 32 and 34 from lateral displacement or "canting." Another advantage inhering to the hereinbefore described novel form of concentric valve unit is that by employing the valve elements 12, 13 I increase the valve lift area very considerably with a proportionate decrease in the annular seat areas 8—11 when contrasted with previous designs and corresponding sizes of similarly functioning valves. In other words, by the present invention, there is provided a valve unit the lift whereof is positively determinable and having a substantially increased effective area when compared with the area of a single valve unit of the same size; whereas, it will be readily understood that the pins or studs 26, 26' can be substituted by others when desirable to adjust or vary the lift.

Finally while there has been shown and described one practical embodiment of the invention, it is to be understood that structural changes or variations, in size and relative proportions of the parts, may be resorted to without departing from the spirit and scope of the following claims.

Having thus described my invention, I claim:

1. In a valve of the type described, a seat member having radially-spaced pairs of concentric seats with series of intervening segmental flow ports; annular valve elements coactive with the respective pairs of concentric seats; circumferentially spaced sockets pins or studs intervening the annular valve elements having their upper end surfaces in a common plane, said pins or studs affording mutual guidance for the valve elements during opening and closing, as well as defining a definitely spaced stop level; a combined guard and valve-lift controller supported on said pins or studs; a center-bolt securing the seat member, combined guard and valve-lift controller, and the guide pins or studs in coactive assembly; concentric means in compression intermediate the guard and the respective annular valve elements, serviceable to normally influence the valve elements to the respectively associated pair of concentric seats; and one of the pins or studs aforesaid including means effective to correctly position the combined guard and lift-controller so as to prevent interference with the intended flow through the valve.

2. A valve in accordance with claim 1 wherein the respective seat intervening ports differentiate numerically and are of distinctive arcual extent; wherein said seat includes an annular groove between the inner and outer pair of concentric seats; wherein said annular groove includes a plurality of equally-spaced circumferentially-arranged sockets of predetermined depth for individual mounting of the lift-controller supporting pins or studs; and wherein said seat further embodies a surrounding stop rim to limit its insertion into an apertured support therefor.

3. The invention of claim 1 wherein one of the guard and spacer studs is provided with an axial pin-projection, for engagement in a complemental socket, in the underside of the combined guard and valve-lift controller, whereby the latter is prevented from being improperly positioned relative to the seat flow ports.

4. The invention of claim 1 wherein the combined guard and valve-lift controller includes a central recess, and a concentric outer annular groove, in its lower portion; wherein said recess and groove each houses a variable-pitch spring in compression that respectively coacts with the subjacent annular valve element for influencing the latter to the related pair of concentric seats; and wherein said combined guard and lift controller further includes an axial bore with a surrounding annular series of circumferentially-spaced flow-passages through the end wall of the central recess.

5. The invention of claim 1 wherein each annular valve element is preferably of the species cross-sectionally embodying an annular arched ridge intermediate inner and outer concaved rim portions; and wherein the means in compression intermediate the guard member and said valve elements each consists of a concentrically coiled spring that coacts with the inner concaved rim portion of the respectively associated valve element.

BERNARD L. SCHWALLER.

REFERENCES CITED

The following references are of record in the file of this patent:

UNITED STATES PATENTS

| Number | Name | Date |
| --- | --- | --- |
| 1,343,534 | Voss | June 15, 1920 |
| 1,551,697 | Richardson | Sept. 1, 1925 |
| 2,344,818 | Hutton | Mar. 21, 1944 |